US009606376B2

(12) United States Patent
Filutowski et al.

(10) Patent No.: US 9,606,376 B2
(45) Date of Patent: Mar. 28, 2017

(54) EYEGLASSES WITH CHANGEABLE IMAGE DISPLAY AND RELATED METHODS

(71) Applicants: Oliver Filutowski, Longwood, FL (US); Pamela Filutowski, Longwood, FL (US)

(72) Inventors: Oliver Filutowski, Longwood, FL (US); Pamela Filutowski, Longwood, FL (US)

(*) Notice: Subject to any disclaimer, the term of this patent is extended or adjusted under 35 U.S.C. 154(b) by 0 days.

(21) Appl. No.: 14/824,177

(22) Filed: Aug. 12, 2015

(65) Prior Publication Data

US 2015/0346519 A1    Dec. 3, 2015

Related U.S. Application Data

(63) Continuation of application No. 13/611,625, filed on Sep. 12, 2012, now Pat. No. 9,140,910.

(Continued)

(51) Int. Cl.
*G02C 11/02* (2006.01)
*G02C 13/00* (2006.01)
(Continued)

(52) U.S. Cl.
CPC ............ *G02C 13/003* (2013.01); *G02C 11/02* (2013.01); *G02C 11/10* (2013.01); *G02B 2027/014* (2013.01); *G02B 2027/0178* (2013.01)

(58) Field of Classification Search
CPC .......... G02B 2027/0178; G02B 27/017; G02B 27/0172; G02B 2027/014; G02B 2027/0138; G02B 2027/0141
(Continued)

(56) References Cited

U.S. PATENT DOCUMENTS

| 5,946,071 A | 8/1999 | Feldman |
| 6,608,996 B1 | 8/2003 | Laurikka et al. |

(Continued)

FOREIGN PATENT DOCUMENTS

| CN | 101819334 | 9/2010 |
| JP | 58-113912 | 7/1983 |

(Continued)

OTHER PUBLICATIONS

E Ink Pearl Imaging Film; Monochrome Active Matrix: www.eink.com/display_products_pearl.html.
(Continued)

*Primary Examiner* — Huy K Mai
*Assistant Examiner* — Daniele Manikeu
(74) *Attorney, Agent, or Firm* — Allen, Dyer, Doppelt, Milbrath & Gilchrist, P.A.

(57) ABSTRACT

Eyeglasses may include a frame body and at least one lens carried by the frame body, and at least one display carried on at least one exterior surface of the frame body and configured to display a changeable image thereon. The at least one display may be conformal to the at least one exterior surface. The eyeglasses may further include a communications interface carried by the frame body, and a controller carried by the frame body and coupled to the at least one display and the communications interface. The controller may be configured to receive display data via the communications interface, and selectively change the image on the at least one display based upon the received display data to thereby change an external visual appearance of the frame body.

30 Claims, 4 Drawing Sheets

Related U.S. Application Data

(60) Provisional application No. 61/561,506, filed on Nov. 18, 2011.

(51) Int. Cl.
*G02C 11/00* (2006.01)
*G02B 27/01* (2006.01)

(58) Field of Classification Search
USPC ....... 351/246, 51; 359/633, 242; 345/8, 156, 345/158, 207, 589, 593
See application file for complete search history.

(56) References Cited

U.S. PATENT DOCUMENTS

| | | | |
|---|---|---|---|
| 6,777,710 B1 | 8/2004 | Koyama | |
| 6,997,552 B1 | 2/2006 | Hung | |
| 7,175,273 B2 | 2/2007 | Lee | |
| 7,503,650 B2 | 3/2009 | Furry | |
| 7,648,236 B1* | 1/2010 | Dobson | G02C 11/10 345/8 |
| 2005/0248722 A1 | 11/2005 | Nelis | |
| 2007/0075922 A1* | 4/2007 | Jessop | G02B 26/005 345/49 |
| 2008/0258999 A1 | 10/2008 | Van Doorn | |
| 2008/0297716 A1 | 12/2008 | Tsai | |
| 2010/0177035 A1* | 7/2010 | Schowengerdt | G06F 1/163 345/156 |
| 2010/0313334 A1 | 12/2010 | Moy | |
| 2011/0043644 A1* | 2/2011 | Munger | G02B 27/017 348/207.1 |

FOREIGN PATENT DOCUMENTS

| | | |
|---|---|---|
| JP | 58-113913 | 7/1983 |
| JP | 58-113914 | 7/1983 |
| JP | 06-230322 | 8/1994 |
| WO | 94/09398 | 4/1994 |

OTHER PUBLICATIONS

E Ink Surf: Segmented Solutions: www.eink.com/display_products_surf.html.
E Ink Triton Imaging Film: Color Active Matrix: www.eink.com/disply_products_triton.html.
http://www.departures.com/articles/smartwatch-the-new-watch-technology "Good Timing".

* cited by examiner

EYEGLASSES WITH CHANGEABLE IMAGE DISPLAY AND RELATED METHODS

RELATED APPLICATIONS

This application is based upon prior filed provisional application Ser. No. 61/561,506 filed Nov. 18, 2011 and patent application Ser. No. 13/611,625 filed Sep. 12, 2012, the disclosures of which are hereby incorporated herein by reference in their entireties.

TECHNICAL FIELD

The present disclosure generally relates to eye ware, and, more particularly, to eyeglasses and related methods.

BACKGROUND

Many decorative styles and colors of eyeglasses are available for wearers of eyeglasses. In addition to the physical attributes (e.g., shape, design, materials) and decorations (paint, inlays, etc.), some providers have attempted to further enhance eyeglasses with other features. For example, U.S. Pat. Pub. No. 2008/0258999 to Van Doorn discloses a color coordinating personal use device, particularly for eyeglasses, including a color detector to detect a color of an object of personal use and a color changing material of the personal use item that color changes to a color based on the detected color.

U.S. Pat. Pub. No. 2005/0248722 to Nelis discloses interactive eye glasses comprising a frame, at least one lens and a display. The frame includes at least one lens support, a pair of opposing leg members and a display assembly coupling member. The pair of opposing leg members are coupled to the lens support. The display assembly coupling member is associated with at least one of the lens support and at least one of the pair of opposing leg members. The at least one lens is coupled to the lens support. The display assembly comprises a display screen, a control circuitry and a power means. The display screen is capable of displaying one of images and alpha-numeric characters and is coupled to the display assembly coupling member. The control circuitry is electronically coupled to the display screen. The power means is capable of electrically powering the control circuitry and display screen.

Despite the existence of such configurations, further enhancements in eyeglasses may be desirable in some applications.

SUMMARY

Eyeglasses may include a frame body and at least one lens carried by the frame body, and at least one display carried on at least one exterior surface of the frame body and configured to display a changeable image thereon. The at least one display may be conformal to the at least one exterior surface. The eyeglasses may further include a communications interface carried by the frame body, and a controller carried by the frame body and coupled to the at least one display and the communications interface. The controller may be configured to receive display data via the communications interface, and selectively change the image on the at least one display based upon the received display data to thereby change an external visual appearance of the frame body. Accordingly, the eyeglasses may be considered to have an electronic "skin" that can be changed to provide desired images on one or more exterior surfaces.

More particularly, the frame body may include a frame front carrying the at least one lens and having first and second opposing ends, a first end piece coupled to the first end of the frame front, and a second end piece carried by the second end of the frame front. In one example embodiment, the at least one display may be carried on exterior surfaces of the frame front and at least one of the first and second end pieces. In another example embodiment, the at least one display may comprise a respective display carried on at least two of the frame front, the first end piece, and the second end piece. Furthermore, the controller may be configured to display different images on the displays.

The eyeglasses may further include a light sensor carried by the frame and coupled with the controller, and the controller may be configured to change the image on the at least one display based upon the light sensor. By way of example, the at least one display may comprise at least one passive display, at least one electronic ink display, etc. The communications interface may comprise a wireless communications interface, for example.

A related system may include eyeglasses, such as those described briefly above, and a mobile communications device configured to communicate the display data to the controller via the communications interface.

A related method for making eyeglasses may include mounting at least one lens, at least one display, a communications interface, and a controller on a frame body. Mounting the at least one display may include conformally mounting the at least one display on at least one exterior surface of the frame body, and the at least one display may be configured to display a changeable image thereon. The controller may be configured to receive display data via the communications interface, and to selectively change the image on the at least one display based upon the received display data to thereby change an external visual appearance of the frame body.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
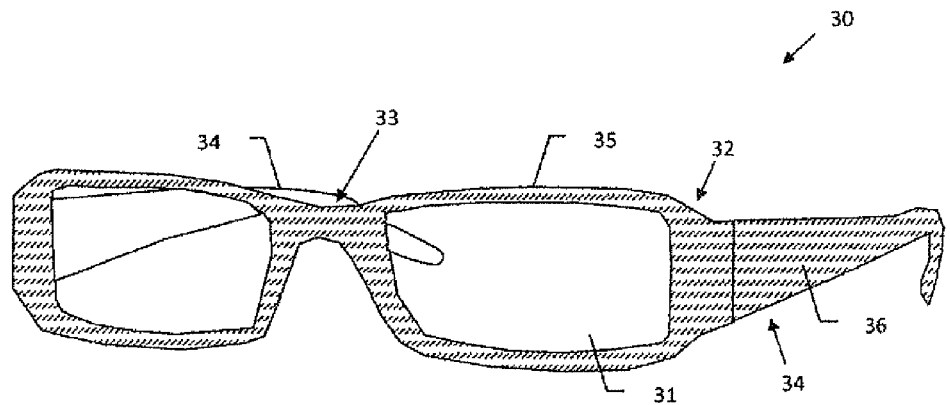
FIGS. 1-3 are perspective views of a pair of eyeglasses including displays providing for changeable images.

Referring initially to FIG. 1, a pair of eyeglasses 30 includes frames (i.e., a frame body) and lenses 31. In the present example, the frames illustratively include a frame front 32, a bridge 33, and end pieces 34. Although not visible in the illustrated example, it will be appreciated that the frames may further include hinges, temples, nose pads, etc., depending upon the given style or configuration of the eyeglasses. The eyeglasses 30 further illustratively include a frame front display 35 on the frame front 32, and a respective end piece display 36 on each of the end pieces 34 (only the left end piece display is visible in the perspective view of FIG. 1). Generally speaking, the displays 35, 36 may comprise electronic paper (ePaper) or electronic ink displays, such as color active matrix displays (e.g., Triton imaging film from EInk Corporation), monochrome active matrix displays (e.g., Pearl imaging film from EInk Corporation), or segmented displays (e.g., SURF segmented displays from EInk Corporation). Another display type may include organic light-emitting diode (OLED) displays, for example.

The displays 35, 36 may be conformally mounted to the exterior surfaces of the frame front 32, bridge 33, and/or end pieces 34. That is, one or more displays 35, 36 may be conformed to the shape and/or geometry/curvature of the various external surfaces so that the displays appear as an electronic "skin" of the eyeglasses that can be changed (i.e., by changing images) to thereby change an external visual appearance of the frames. The displays 35, 36 may be attached, wrapped, or otherwise mounted on the various external surfaces at the time of manufacturing of the eyeglasses 30, or in some embodiments the displays and associated control circuitry may be applied as an after-market item to retrofit a pair of eyeglasses. For example, the displays 35 and/or 36 and associated control circuitry, as will be discussed further below, may be provided in a respective shape for a given style of eyeglasses 30, which may be carried on a flexible substrate with an adhesive backing to be applied to the external surface(s) of the eyeglasses like a sticker. In another example embodiment, the display 35 and/or 36 may be carried on a fabric or other flexible substrate and fitted on the frame front 32 and/or end pieces 34 like a sock or sleeve.

Although shown as separate displays 35, 36 in the illustrated examples, it should be noted that in some embodiments a single or unitary display may be wrapped around to cover external surfaces of the frame front 32 and end pieces 34, rather than having separate displays, for example. This may be appropriate for frames in which the end pieces 34 are not attached to the frame front 32 by hinges (e.g., where the frame body is a single molded piece).

In some embodiments, passive displays may be used, in that they do not require a constant power source to maintain an image thereon. This may be particularly advantageous in that a battery need not be carried by the frames to provide power to the displays 35, 36 so that they may maintain their respective images thereon. However, in some embodiments a battery (e.g., a rechargeable battery) may be carried by the frames for powering the displays 35, 36, and other electronic components as necessary. Generally speaking, the lower the power consumption of the displays 35, 36, the smaller the battery that may be used, and this may also allow longer times between recharging.

Figure 6:
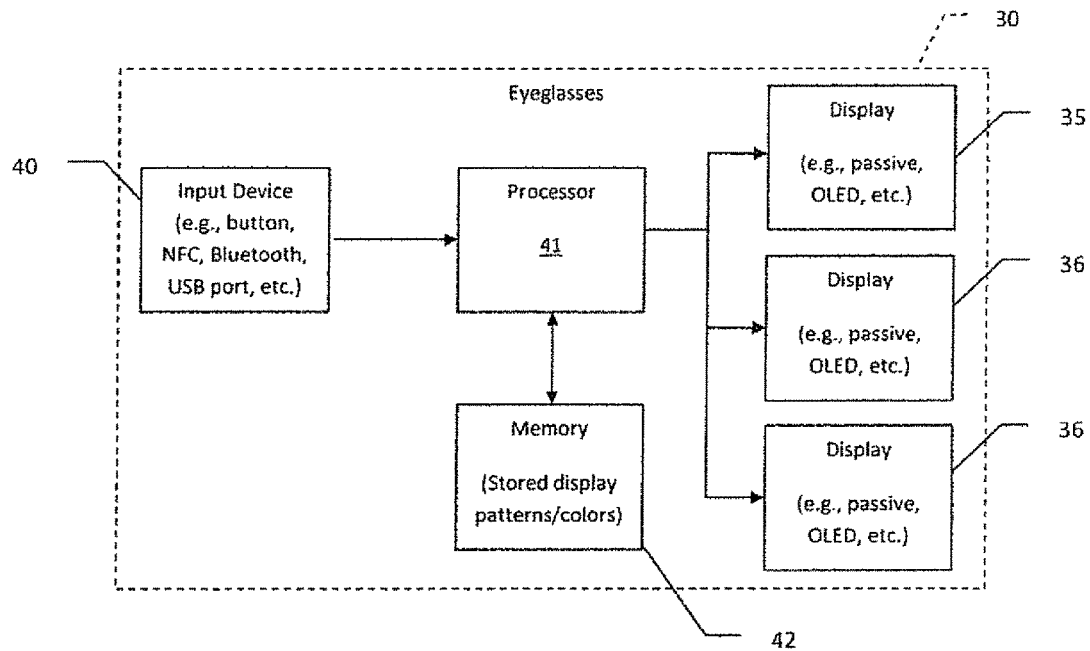
FIG. 6 is a schematic block diagram illustrating exemplary components which may be used with the eyeglasses of FIGS. 1-3 and 5.

Referring additionally to FIG. 6, the eyeglasses 30 may further include one or more input devices 40, an optional memory 42 for storing images to be displayed, and a processor or controller 41 coupled to the input device, the memory, and the displays 35, 36. In some embodiments, the input device 40 may comprise a wireless interface device, by which different images may be stored to the memory 42 and the different images may be selectively changed on the displays 35, 36 (or the images may be provided directly to the displays, such as in embodiments where no memory is included). By way of example, near field communication (NFC), Bluetooth, wireless LAN (WLAN), personal area network (PAN), or other suitable wireless communication devices may be used in various embodiments.

The displays 35, 36 may be coupled to the processor 41 by suitable connectors such as flex connectors, printed circuit traces, etc. In some embodiments, electrical contacts points or terminals may be placed on the frame front 32 and end pieces 34 such that when the end pieces are folded out, contact is made between the terminals to provide electrical connection to the processor 41, for example. It should also be noted that in some embodiments respective processors 41 and input devices 40 may be used for the different displays 35, 36. Using the example of NFC, a user may accordingly be able to tap each of the displays 35, 36 separately to "bump" the respective desired image(s) thereto.

Figure 5:
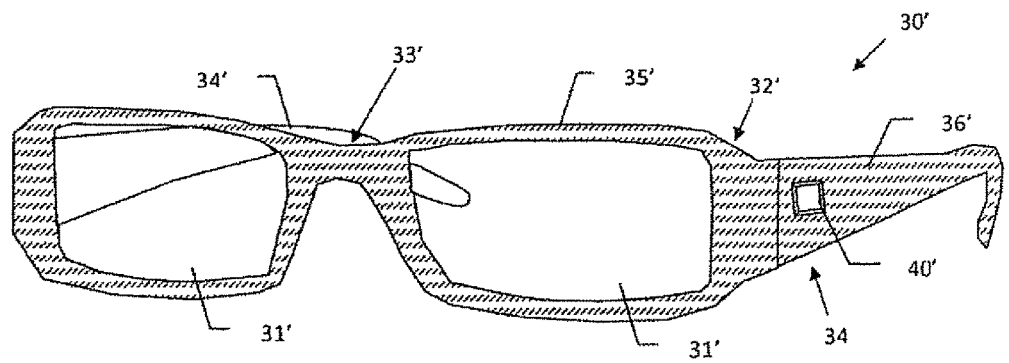
FIG. 5 is a perspective view of an alternative embodiment of the eyeglasses of FIG. 1 including a manual switch for changing the images of the displays.

In some embodiments, the input device 40 may comprise a wired input port or connector, such as a USB port, for example, to allow the processor 41 to communicate with a computer, etc. In the example of FIG. 5, another example input device 40' is a button or switch (or multiple buttons/switches), which upon activation or pressing may cause the image on one or more of the displays 35', 36' to change, thus allowing scrolling or cycling through a plurality of different images stored in the memory 42. This may advantageously allow a user to change the design for different occasions, and while away from a computer, for example. The processor 41 may include appropriate hardware (e.g., microprocessor or special purpose logic circuit), and a non-transitory computer-readable medium having computer-executable instructions to interface with a computing device to store the images in the memory 42, as well as to drive the various displays 35', 36'.

Figure 2:
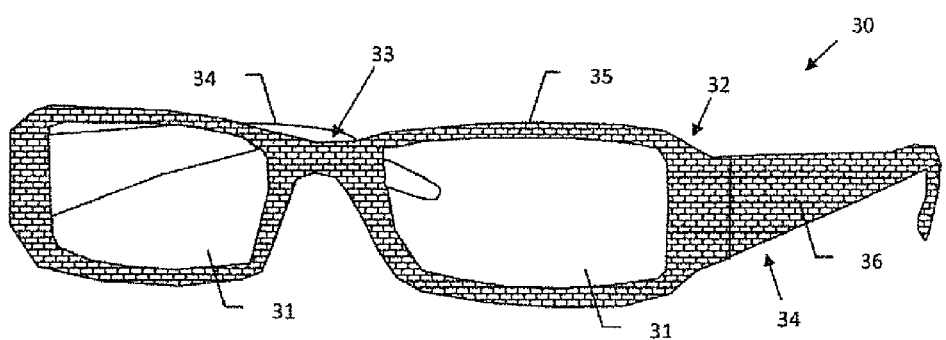
Figure 3:
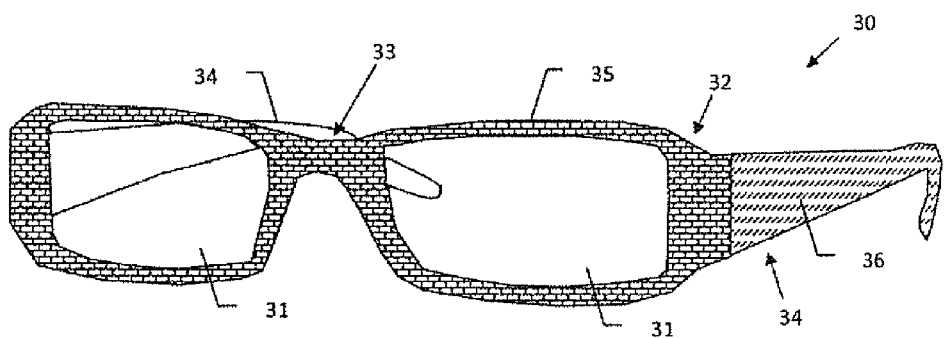

Generally speaking, the images which may be displayed on the displays 35, 36 may include different colors, patterns, shapes, alphanumeric characters, etc. In the example of FIG. 1, both the frame front display 35 and the end piece displays 36 are displaying a same image (illustratively represented by a dashed pattern). In FIG. 2, the images on the displays 35, 36 have both been changed to a same new image, which is illustratively represented by a "brick" pattern. In the example of FIG. 3, different images are displayed on the frame front display 35 and the end piece displays 36. In some embodiments, the end piece displays 36 may also display different images from one another, if desired.

In other words, different displays 35, 36 may be programmed independently of the other displays to display different respective images, or all of the displays may be programmed as a group. Additionally, images may be moving or static. A light sensor (not shown) may also be used to determine a level of illumination to be emitted from the displays 35, 36 (i.e., the illumination characteristics (e.g., brightness, contrast, etc.) of the displays may be changed based upon ambient light conditions). Similarly, the designs or images may change with ambient light conditions as well, or based on a time schedule (e.g., different images are displayed at different times of the day). By way of example, design images may be provided as stock designs prepared for immediate download onto the frames, or custom designs, individually created by the eyeglasses wearer (or others)

through a computer program or mobile app designed specifically to be used with the programmable glasses.

More particularly, through the use of digital images/designs, the single pair of eyeglasses 30 may advantageously offer numerous design or style options for the eyeglass wearer. The images on the displays 35, 36 change, while the physical structure of the frames does not. The images or designs may be created on a computer or mobile computing device and downloaded to the memory 42 (or directly to the displays 35, 36 in embodiments where a memory is not included to store the different images), giving the wearer the opportunity to change the color and/or design of the frames without having to purchase additional pairs of frames or physical painted covers to snap onto the frames. In this way, the displays 35, 36 may essentially provide a changeable "electronic skin" for the eyeglasses 30. It should be noted that, in some embodiments, not all of the displays 35, 36 need be included (e.g., in some embodiments only the front face display may be included, or only the end piece displays).

Figure 4:
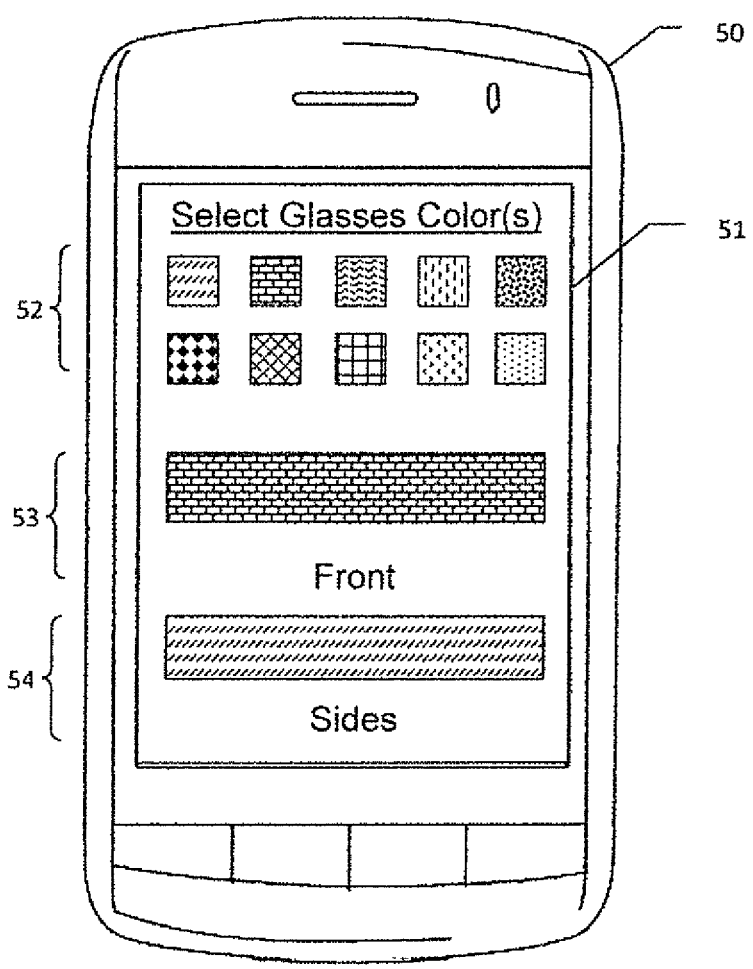
FIG. 4 is a front view of a mobile communications device which may be used to change the images on the displays of the eyeglasses of FIGS. 1-3.

In accordance with an example now described with reference to FIG. 4, an application or "app" for changing the images on the displays 35, 36 may be installed on a mobile communications device 50 (here a smartphone) including a display 51 (a touch screen display in the illustrated example, although non-touch screen displays may also be used). The application when run on the mobile device 50 provides a selection screen on the display 51, which includes an area 52 for selection of images or colors, and regions 53 and 54 for respectively designating which of the images/colors are to be displayed on the front and sides of the eyeglasses (i.e., on the frame front display 35 and the end piece displays 36). The selection choices may be transferred to the eyeglasses 30 by way of wireless communications (e.g., NFC, Bluetooth, etc.), or by coupling the eyeglasses 30 to the mobile device 50 via a wired connection (e.g., via a USB cord, etc.), as noted above.

Figure 7:
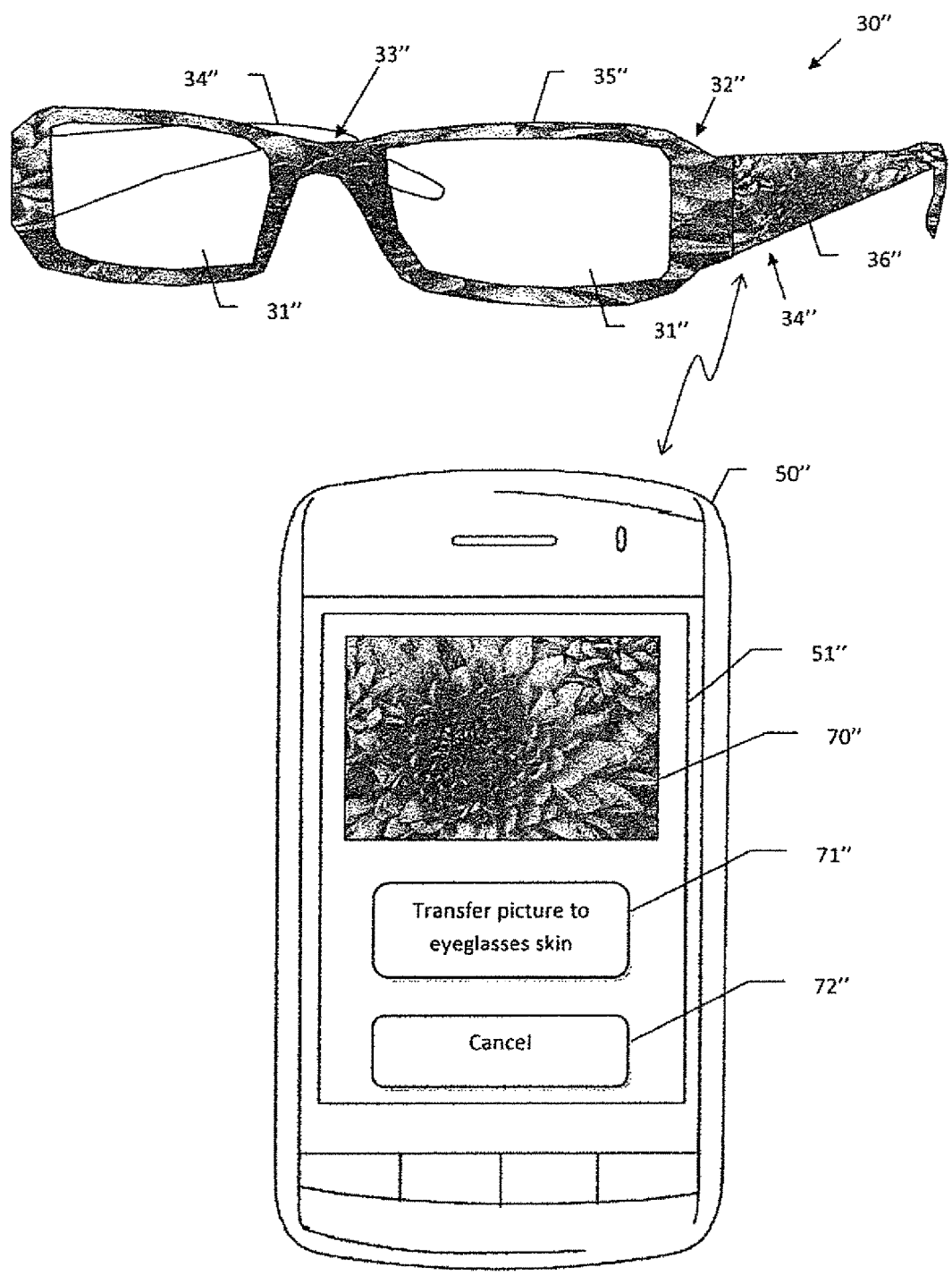
FIG. 7 is a perspective view of an alternative embodiment of the eyeglasses of FIG. 1 and an associated mobile communications device for changing the images on the displays.

Turning now additionally to FIG. 7, another example embodiment is described in which a mobile device 50" includes a camera for taking digital pictures. In the illustrated example, a digital picture image of a flower has been captured by the camera and displayed on a window 70" on the display 51". The mobile device 50" provides a user with on-screen buttons 71" and 72" for respectively selecting to transfer the picture of the flower to the displays 35", 36", or canceling the operation. In the illustrated example, the picture data for the flower image is communicated to the eyeglasses through the use of a wireless interface/input device, as described above. The displays 35", 36" will therefore appear as a flower "skin" on the exterior or outside surfaces of the eyeglasses 30".

It should be noted that picture images other than those captured by the camera may also be transferred to the displays 35" and/or 36". For example, pictures that are received by email, MMS, downloaded from a computer or the Internet, etc., may similarly be transferred to the one or more of the displays 35" and/or 36". Moreover, the application which transfers the pictures may cause the mobile device to appropriately format the pictures for display on the particular displays 35", 36" that are being used (or these pictures may be formatted appropriately on a separate computer, etc., in some embodiments). Moreover, it should also be noted that multiple different photos or images may be displayed, either by segmenting a single display or displaying different images on different displays, as noted above. Where different photos or images are pieced or stitched together, there may be different types of transitions between the them (e.g., a split line, faded transition, zigzag, etc.). Additionally, the application running on the mobile device 50" may allow various parameters of the photos or other images to be changed, such as contrast, brightness, etc., in some embodiments.

Many modifications and other embodiments of the invention will come to the mind of one skilled in the art having the benefit of the teachings presented herein. For example, in addition to eyeglasses, the above-described approach may be used with other wearable accessories, such as watches, bracelets, etc. Therefore, it is understood that the invention is not to be limited to the specific exemplary embodiments disclosed herein.

That which is claimed is:

1. A method comprising:
    communicating at least one digital picture file from an external communication device to eyeglasses comprising a frame body and at least one lens carried by the frame body, at least one display carried on at least one exterior surface of the frame body with the at least one display being conformal to the at least one exterior surface, and a communications interface carried by the frame body;
    receiving the at least one digital picture file at the eyeglasses via the communications interface; and
    displaying a digital picture on the at least one display based upon the received at least one digital picture file to thereby change an external visual appearance of the frame body.

2. The method of claim 1 wherein the external communication device comprises a digital camera configured to generate the digital picture file.

3. The method of claim 1 wherein the frame body comprises:
    a frame front carrying the at least one lens and having first and second opposing ends;
    a first end piece coupled to the first end of the frame front; and
    a second end piece carried by the second end of the frame front.

4. The method of claim 3 wherein the at least one display is carried on exterior surfaces of the frame front and at least one of the first and second end pieces.

5. The method of claim 3 wherein the at least one display comprises a respective display carried on at least two of the frame front, the first end piece, and the second end piece.

6. The method of claim 5 wherein the at least one digital picture file comprises a plurality of different digital picture files, and wherein displaying comprises displaying different digital pictures on the displays.

7. The method of claim 1 wherein the eyeglasses further comprise a light sensor carried by the frame and coupled with said controller; and further comprising changing the digital picture on the at least one display based upon the light sensor.

8. The method of claim 1 wherein the at least one display comprises at least one organic light-emitting diode (OLED) display.

9. The method of claim 1 wherein the at least one display comprises at least one electronic ink display.

10. The method of claim 1 wherein the communications interface comprises a wireless communications interface.

11. The method of claim 1 wherein the external communication device comprises a mobile wireless communications device.

12. A non-transitory computer-readable medium for a processor associated with eyeglasses comprising a frame body and at least one lens carried by the frame body, at least one display carried on at least one exterior surface of the frame body with the at least one display being conformal to the at least one exterior surface, and a communications interface carried by the frame body, the non-transitory computer-readable medium having computer-executable instructions for causing the processor to perform steps comprising:
   receiving at least one digital picture file from an external communication device via the communications interface; and
   displaying a digital picture on the at least one display based upon the received at least one digital picture file to thereby change an external visual appearance of the frame body.

13. The non-transitory computer readable medium of claim 12 wherein the external communication device comprises a digital camera configured to generate the digital picture file.

14. The non-transitory computer-readable medium of claim 12 wherein the frame body comprises:
   a frame front carrying the at least one lens and having first and second opposing ends;
   a first end piece coupled to the first end of the frame front; and
   a second end piece carried by the second end of the frame front.

15. The non-transitory computer-readable medium of claim 14 wherein the at least one display is carried on exterior surfaces of the frame front and at least one of the first and second end pieces.

16. The non-transitory computer-readable medium of claim 14 wherein the at least one display comprises a respective display carried on at least two of the frame front, the first end piece, and the second end piece.

17. The non-transitory computer-readable medium of claim 16 wherein the at least one digital picture file comprises a plurality of different digital picture files, and wherein displaying comprises displaying different digital pictures on the displays.

18. The non-transitory computer-readable medium of claim 12 wherein the at least one display comprises at least one organic light-emitting diode (OLED) display.

19. The non-transitory computer-readable medium of claim 12 wherein the at least one display comprises at least one electronic ink display.

20. The non-transitory computer-readable medium of claim 12 wherein the communications interface comprises a wireless communications interface.

21. A method comprising:
   communicating at least one digital design file from an external communication device to eyeglasses comprising a frame body and at least one lens carried by the frame body, at least one display carried on at least one exterior surface of the frame body with the at least one display being conformal to the at least one exterior surface, and a communications interface carried by the frame body;
   receiving the at least one digital design file at the eyeglasses via the communications interface; and
   displaying a digital design on the at least one display based upon the received at least one digital design file to thereby change an external visual appearance of the frame body.

22. The method of claim 21 wherein the frame body comprises a frame front carrying the at least one lens and having first and second opposing ends, a first end piece coupled to the first end of the frame front, and a second end piece carried by the second end of the frame front; and wherein the at least one display is carried on exterior surfaces of the frame front and at least one of the first and second end pieces.

23. The method of claim 22 wherein the at least one digital design file comprises a plurality of different digital design files, and wherein displaying comprises displaying different digital designs on the displays.

24. The method of claim 21 wherein the eyeglasses further comprise a light sensor carried by the frame and coupled with said controller; and further comprising changing the digital design on the at least one display based upon the light sensor.

25. The method of claim 21 wherein the communications interface comprises a wireless communications interface.

26. A non-transitory computer-readable medium for a processor associated with eyeglasses comprising a frame body and at least one lens carried by the frame body, at least one display carried on at least one exterior surface of the frame body with the at least one display being conformal to the at least one exterior surface, and a communications interface carried by the frame body, the non-transitory computer-readable medium having computer-executable instructions for causing the processor to perform steps comprising:
   receiving at least one digital design file from an external communication device via the communications interface; and
   displaying a digital design on the at least one display based upon the received at least one digital design file to thereby change an external visual appearance of the frame body.

27. The non-transitory computer-readable medium of claim 26 wherein the frame body comprises a frame front carrying the at least one lens and having first and second opposing ends, a first end piece coupled to the first end of the frame front, and a second end piece carried by the second end of the frame front; and wherein the at least one display is carried on exterior surfaces of the frame front and at least one of the first and second end pieces.

28. The non-transitory computer-readable medium of claim 27 wherein the at least one digital design file comprises a plurality of different digital design filed, and wherein displaying comprises displaying different digital designs on the displays.

29. The non-transitory computer-readable medium of claim 26 wherein the eyeglasses further comprise a light sensor carried by the frame and coupled with said controller; and further having computer-executable instructions for causing the processor to change the digital design on the at least one display based upon the light sensor.

30. The non-transitory computer-readable medium of claim 26 wherein the communications interface comprises a wireless communications interface.

* * * * *